United States Patent [19]

Shorrocks et al.

[11] Patent Number: 5,095,215
[45] Date of Patent: Mar. 10, 1992

[54] THERMAL IR DETECTOR ELECTRODE CONFIGURATION

[75] Inventors: Nicholas M. Shorrocks; Robert C. Twiney, both of Northampton; Roger W. Whatmore, Milton Keynes, all of England

[73] Assignee: Plessey Overseas Limited, Ilford, England

[21] Appl. No.: 548,960

[22] PCT Filed: Nov. 27, 1989

[86] PCT No.: PCT/GB89/01418

§ 371 Date: Sep. 21, 1990

§ 102(e) Date: Sep. 21, 1990

[87] PCT Pub. No.: WO90/06495

PCT Pub. Date: Jun. 14, 1990

[30] Foreign Application Priority Data

Nov. 30, 1988 [GB] United Kingdom ............... 8827932

[51] Int. Cl.$^5$ ................................. G01J 5/10
[52] U.S. Cl. .................................. 250/338.1
[58] Field of Search ....................... 250/338.1, 338.3

[56] References Cited

U.S. PATENT DOCUMENTS

| | | | |
|---|---|---|---|
| 3,453,432 | 7/1969 | McHenry | 250/338.3 |
| 3,896,311 | 7/1975 | Taylor et al. | 250/342 |
| 4,053,806 | 10/1977 | Turnbull et al. | 250/338.3 |
| 4,060,729 | 11/1977 | Byer et al. | 250/338.3 |
| 4,225,786 | 9/1980 | Perlman | 250/342 |
| 4,379,971 | 4/1983 | Smith et al. | 250/342 |
| 4,383,174 | 5/1983 | Matsumura | 250/338.3 |

FOREIGN PATENT DOCUMENTS

| | | | |
|---|---|---|---|
| 0063421 | 3/1982 | European Pat. Off. | 250/338.3 |
| 2228250 | 6/1972 | Fed. Rep. of Germany | 250/336.3 |
| 3315457 | 3/1973 | Fed. Rep. of Germany | 250/338.3 |
| 123324 | 11/1985 | Japan | 250/338.3 |
| 2124827 | 7/1982 | United Kingdom | 250/338.3 |

*Primary Examiner*—Carolyn E. Fields
*Assistant Examiner*—James E. Beyer
*Attorney, Agent, or Firm*—Fleit, Jacobson, Cohn, Price, Holman & Stern

[57] ABSTRACT

A dielectric bolometer thermal detector of infra-red radiation comprises a layer of dielectric bolometer material, a thermally insulating layer therebelow, a pair of electrodes located on one and the same side of said layer of dielectric bolometer material, a source of bias voltage for providing a bias voltage to said electrode so as to provide a bias field in said layer of bolometer material and a pair of read out contacts respectively connected to said electrodes. A signal which appears between said contacts in response to the application of radiation to said layer of dielectric bolometer material constitutes an output of the detector.

4 Claims, 2 Drawing Sheets

THERMAL IR DETECTOR ELECTRODE CONFIGURATION

BACKGROUND OF THE INVENTION

Pyroelectric infra-red detectors and detector arrays are used in a wide variety of applications and at operating frequencies ranging from just a few hertz to several kilohertz. Various materials have been used in this application ranging from TGS crystal through PVDF polymer to various ceramic formulations. The PZ family of ceramics, in particular, is widely used in thermal infra-red detector applications.

A significant improvement in signal-to-noise ratio can be achieved by the use of material which can be made to behave as a dielectric bolometer material, for example, lead scandium tantalate ($Pb_2ScTaO_6$). Functionally very similar to a conventional pyroelectric material, the dielectric bolometer relies upon a pyroelectric response induced by a D.C. bias field typically with a magnitude of $1-5 \times 10^6 Vm^{-1}$. To provide an efficient detector, the bias field should be substantially uniform in magnitude throughout the volume of the detector material. Commonly dielectric bolometers can be fabricated from ceramic formulations which mechanically are very similar to conventional pyroelectric ceramics and allow similar processing techniques to be used mechanically to thin the materials and to define suitable electrodes.

The conventional approach to detector design is to define the detector by electrode patterning on the material surfaces. Normally, the electrodes consist of two areas defined on opposing faces of the detector material one of the electrode areas supporting some form of radiation absorber structure 20 as shown in FIG. 1 of the accompanying drawings. As shown, the detector structure requires electrical contacts 10,12 to be made to both faces 14,16 of the detector material 18. Two approaches to supporting linear array detector structures are through glue bonding the detector material to a support substrate or solder bonding using solder bumps to an interconnection substrate or readout circuit. With either technology it is difficult to contact both faces of the detector, particularly if the detector material has been reticulated to improve response and reduce thermal crosstalk between adjacent elements in an array. With a pyroelectric detector, this problem can be overcome by using a compensation region designed to cancel out common mode signals such as those caused by mechanical vibration or environmental temperature change. This region is connected in series opposition with the active element and requires electrical contacts to be made to one face of the detector only.

The pyroelectric ceramic is poled uniformly and this gives an output of opposite sign for the compensation region. Such an approach cannot, however, be applied to a dielectric bolometer where the response is induced by an applied field, if the same structure were to be used with two contacts a "compensation" region would then be acting in series complement rather than series opposition.

SUMMARY OF THE INVENTION

An object of the present invention is the provision of a thermal detector having novel electrode configurations which allow the thermal IR detector structure to be defined, whilst retaining the facility to make electrical connections to one face only, of the detector material.

According to the present invention, there is provided a thermal detector of infra-red radiation comprising a layer of detector material having electrodes so arranged that both signal contacts are taken from a single face of the detector material.

In a pyroelectric detector, the active material is either polar or is poled by applying an electric field prior to use. The electrodes used for signal read-out from each element can therefore be different from any used during poling. This is not the case for dielectric bolometers as the electrical polarisation is induced during use by a bias field. The same electrodes are therefore used both for polarisation and for read-out.

The induced polarisation is temperature dependent resulting in an induced pyroelectric coefficient, having a magnitude $P(\underline{E})$ varying with the field strength and having a direction parallel to the field ($\underline{E}$). This induced pyroelectric effect allows the detection of modulated radiation using techniques similar to those used in pyroelectric detectors. In the case of a uniform bias field between matching electrodes of area A, on opposite sides of the detector material, the charge response is:

$$P(/\underline{E}/).\Delta T.A$$

for a temperature fluctuation $\Delta T$. For non-uniform electrical bias and temperature fields varying with position $\underline{r}$ through the detector volume V, the charge response is equal to:

$$\int P[/\underline{E}/(\underline{r})].\Delta T(\underline{r}) . /\underline{E}(\underline{r})/dV/\phi$$

where $\phi$ is the bias voltage applied that generates the field $\underline{E}(\underline{r})$. Thus the local field magnitude determines both the coefficient P and the efficiency with which the polarisation charge couples to the electrodes to generate a detectable charge. The provision of a uniform field therefore represents the most efficient arrangement for this coupling, but has heretofore required connections to both major faces of the detector element.

For a one-sided connection structure, an efficient electrode structure is one which generates a field strength which approaches a uniform field inside the volume within which the temperature fluctuations to be measured are most significant, but which is weak elsewhere. The former condition ensures efficient coupling, the latter excludes unwanted stray capacitance which would degrade the voltage response.

BRIEF DESCRIPTION OF THE DRAWINGS

The invention will be described further, by way of example, with reference to FIGS. 1-4 of the accompanying drawings, in which.

DETAILED DESCRIPTION OF PREFERRED EMBODIMENT

Figure 1:
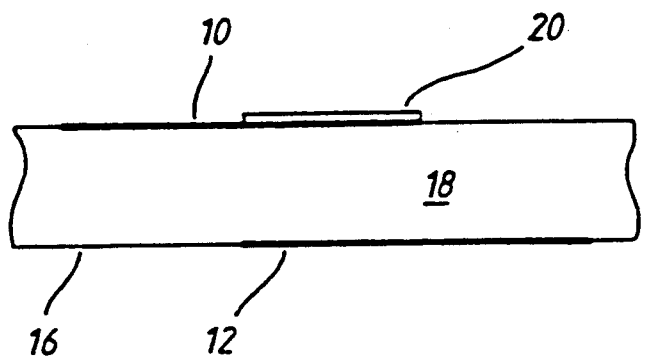
FIG. 1 is a conventional detector design.
Figure 2:
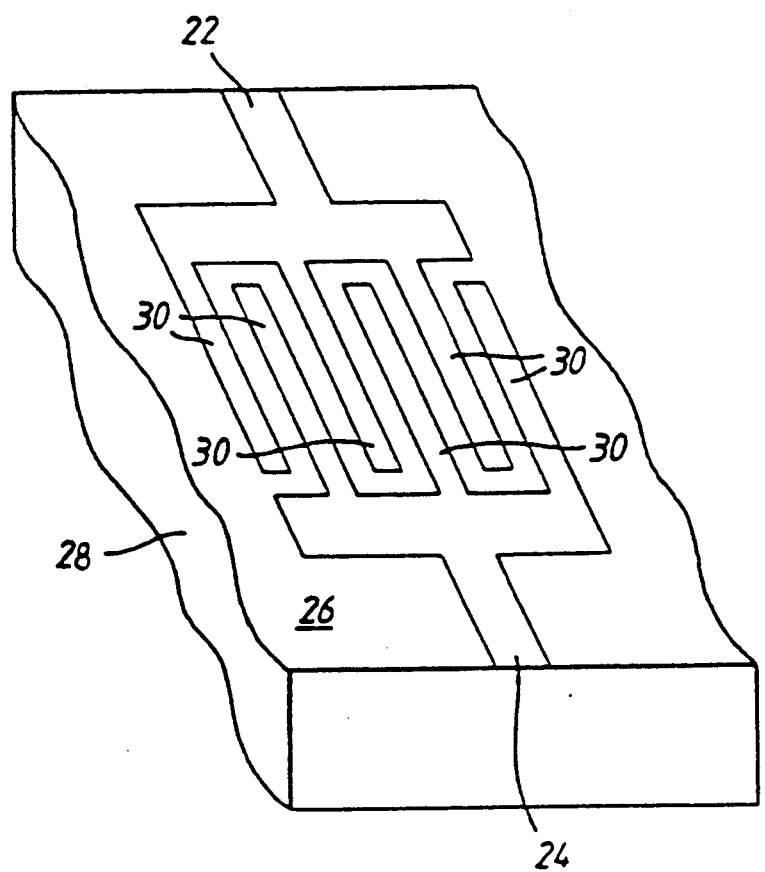
FIG. 2 is a fragmentary perspective view of a thermal infra-red radiation detector.

As shown in FIG. 2, two comb-like electrodes are interleaved on the top (radiation receiving) surface 26 of a thick slab 28 of detector material. Radiation absorbed at the top surface with a modulation frequency f heats material to a depth of approximately one diffusion length of the surface where the diffusion length is [diffusivity/$(2p\pi f)$]$^{\frac{1}{2}}$. If the electrode width to separation ratio is approximately unity, the bias field diminishes rapidly at depths in the slab 28 greater than the interelectrode gap width from the surfaces. If the gap width (between electrode fingers 30) matches the diffusion length then the field magnitude and temperature distributions also match reasonably well.

This match can be improved (see FIG. 3) by using a thin detector 28a with a thermally insulating layer 32 beneath. This layer could either be a gas or a low conductivity polymer; in either case the layer 32 has both lower thermal conductivity and lower electrical permittivity. These act to concentrate both the thermal energy and the electric field within the detector material. With interdigitated electrodes this leads to the structure illustrated in FIG. 3. In this case the design criteria are similar to those of the detector shown in FIG. 2. Electrode gap width (the distance between the fingers 30), electrode width (the width of the individual fingers 30) and, detector material 28a thicknesses are similar to those of FIG. 2 and a detector material thickness not significantly greater than and preferably less than the diffusion length in the detector material is used.

Figure 3:
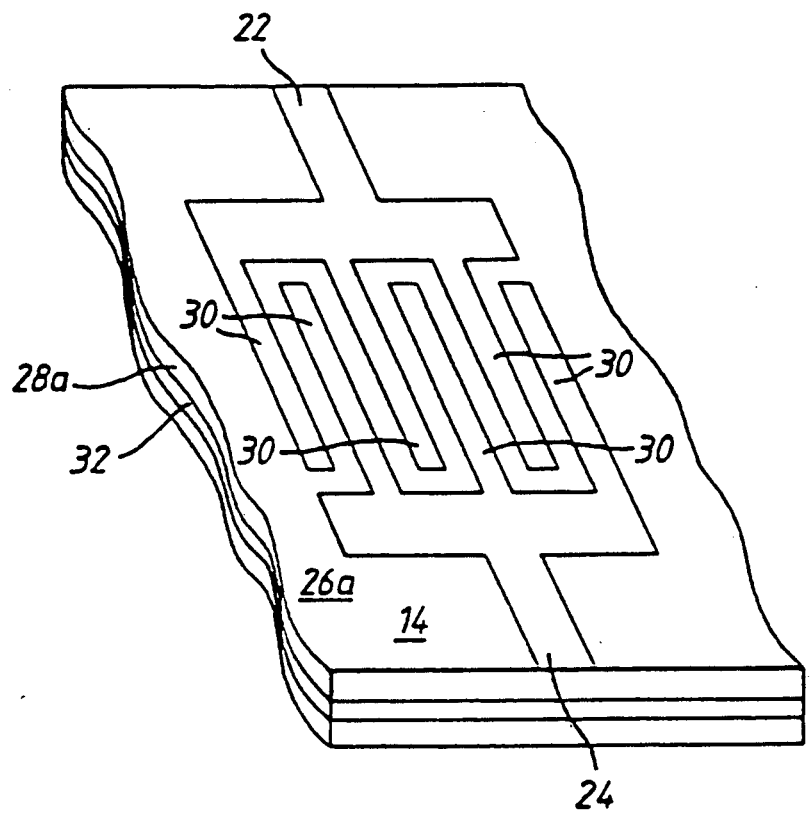
FIG. 3 is a similar view of a preferred form of detector.

For both FIGS. 2 and 3, the effective field within the detector material 28 or 28a volume is approximately $\phi$ divided by the interelectrode gap. Thus if the detector material has been characterised such that an optimum operating field ($E_0$) strength is known, an appropriate value for $\phi$ can be calculated.

Figure 4:
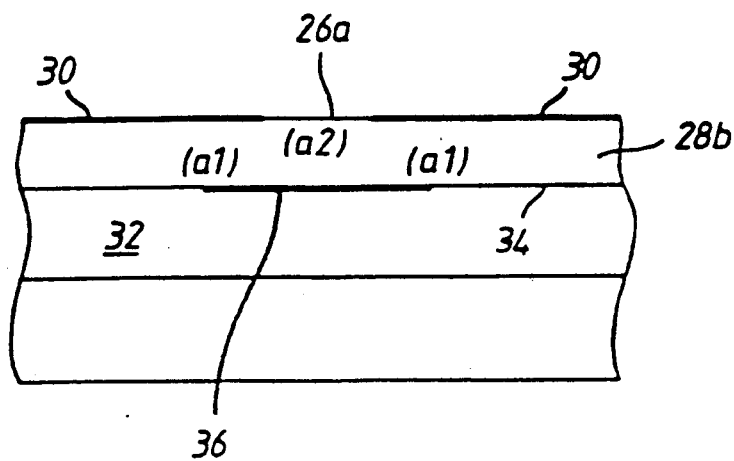
FIG. 4 is a transverse section diagrammatically illustrating a modified detector according to the present invention.

Such an interdigital structure can also be applied to a conventional pyroelectric material, with poling of the ferroelectric being carried out through the interdigital electrodes before use. If an electrode can be deposited upon a second face 34 of a detector material 28b, with isolation, by the use of insulating material 32 as in FIG. 3, the approach of FIG. 4 can be used. The bias voltage is applied and readout contacts are made to the two comb-like electrodes on one face 26a, whilst an electrode 36 on the reverse face 34 is left floating electrically. By symmetry, this electrode 36 is at a potential of half the bias voltage. In volumes (a1), the bias field is approximately uniform in both magnitude and direction. In a central volume (a2) there is a non-uniform fringing field linking the three electrodes 30, 36, 30. Provided the gap between the electrode fingers 30 is one to two times the thickness of the detector material 28b, the field in most of the volume (a2) is strong enough for good coupling of the signal, without being so high as to provide an unnecessarily high risk of electric breakdown across the surface between the electrode fingers 30. The desirable relationships between detector thickness and thermal diffusion lengths that apply to the structure of FIG. 3 also apply to this structure (FIG. 4). The optimum bias voltage $\phi$ is approximately $E_0$ multiplied by twice the detector thickness. The floating electrode 36 can be omitted, to ease fabrication, with the fringing fields in volumes (a2) and to a lesser extent in (a1) providing the signal. Such an arrangement is, of course, less efficient.

FIGS. 3 and 4 assume that the connections are made on the top surface 26a, that is the surface exposed to the infrared radiation signal. If connections can be made on the lower surface 34, the structures can be inverted, with the electrodes applied to the opposite face 34 or, for FIG. 4, 34 and 26a. This is of particular use where the electrical connections are made by solder bump bonding. The arrangement described in relations to FIGS. 2, 3 and 4 may include well known structures for the absorption of infra-red radiation, such as platinum blacks. These can be grown electrochemically from defined areas of the electrodes on the top surfaces of the detectors illustrated in FIGS. 2-4. As the black tends to grow laterally as well as vertically this approach provides useful absorption in the gaps between electrodes. An alternative absorption technique is the use of resistive electrodes, typically 300-400Ω per square. This is of particular relevance to the inverted form of FIG. 4 where a resistive floating electrode would determine both the effective area of the detector in terms of both absorption and electrical activity.

We claim:

1. A dielectric bolometer thermal detector of infrared radiation comprising a layer of dielectric bolometer material of thickness not greater than twice the thermal diffusion length of the lowest operating frequency of the detector, a thermally insulating layer therebelow, a pair of electrodes located on one and the same side of said layer of dielectric bolometer material, a source of bias voltage for providing a bias voltage to said electrodes so as to provide a bias field in said layer of bolometer material and a pair of read out contacts respectively connected to said electrodes, wherein a signal appears between said contacts in response to the application of radiation to said layer of dielectric bolometer material constituting an output of the detector.

2. A detector as claimed in claim 1 wherein the electrodes comprise two areas of metallization, separated by a distance approximately equal to the thickness of said layer of dielectric bolometer material.

3. A detector as claimed 2 in which the electrodes comprise interdigitated comb-like structure with 3 or more fingers.

4. A detector as claimed in claim 1, incorporating a floating, that is electrically unconnected, electrode on the other side of said layer of dielectric bolometer material opposite the electrodes.

* * * * *